April 2, 1957
S. A. YOUNG
2,787,283
VALVE STRUCTURE
Filed Jan. 28, 1953
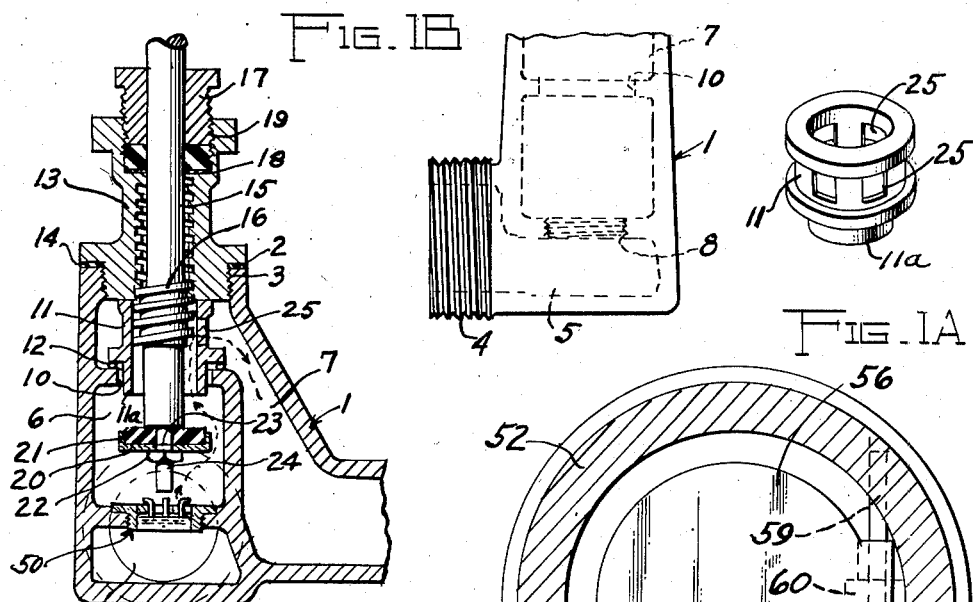
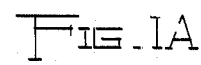
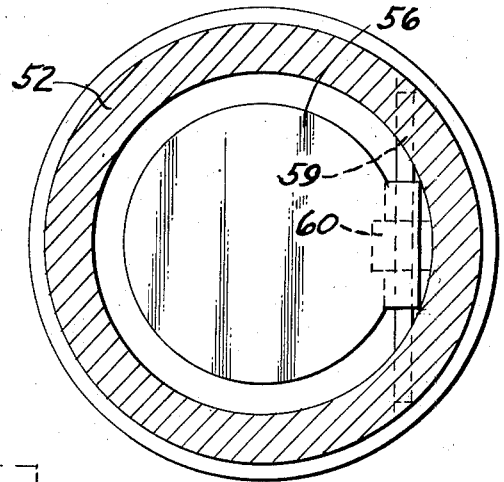
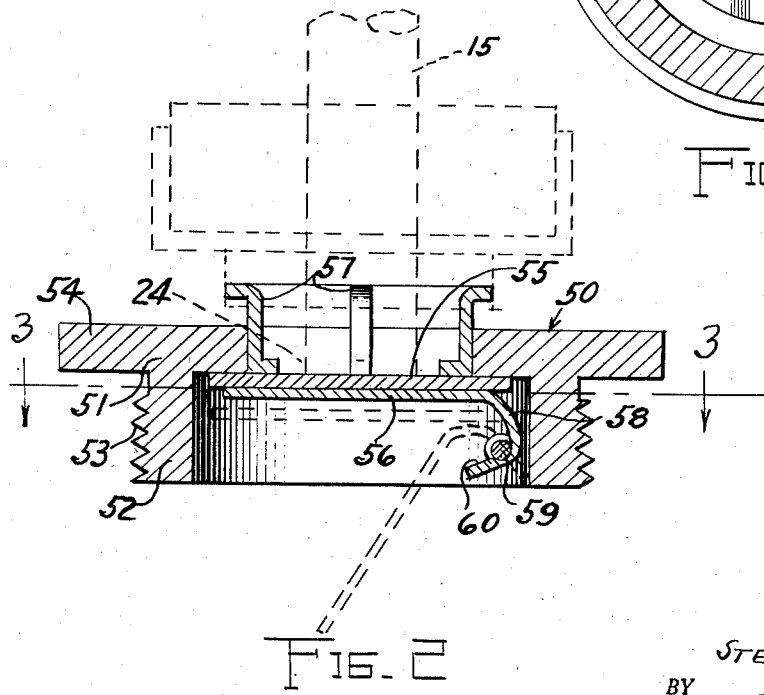
INVENTOR.
STEPHEN A. YOUNG
BY
Robb+Robb
attorneys

United States Patent Office 2,787,283
Patented Apr. 2, 1957

2,787,283

VALVE STRUCTURE

Stephen A. Young, Delphi, Ind.

Application January 28, 1953, Serial No. 333,751

1 Claim. (Cl. 137—329.2)

This invention relates to improvements in valve structure, and primarily such structure which is availed of in plumbing fixtures and may be incorporated in either the exposed or concealed type of such fixtures.

Installation of plumbing fixtures in accordance with many codes and the best practice at the present time, requires that compression angle or straight stops be provided in the line of water supply to the fixture.

The purpose of this is well known making possible replacement of parts of the fixture, such as seat washers without necessitating shutting off the entire supply of water in the house or other place of use.

Under many conditions where codes permit, no stops are used and therefore replacement of stems or washers requires shutting off water to all of the fixtures, in order to repair one of them.

The present invention eliminates any necessity for availing of compression angle or straight stops, and likewise makes possible repair or replacement of parts of the fixture without shutting off of the entire supply as heretofore practiced.

The invention especially resides in the provision of fixtures, which in their structure, combine the usual controlling of the flow of water through the fixture, and includes a secondary or second shut off arrangement which is at least partially automatically operated as far as the shutting off of the flow of water is concerned, but further is controlled by the usual control valve or adjustable flow control member provided.

While the invention has primarily been designed for use in a type of fixture which avails of water pressure to assist in seating of the usual washer provided therefor, and also avails of the water pressure to close the secondary valve unit, it should be understood that the same is not necessarily limited thereto, since the primary function is to provide for a mechanism and means to shut off the water without shutting off the entire supply, and making possible the replacement or renewal of working parts of the fixture.

With the foregoing generally outlined objects of the invention in mind, the specific objects are to provide a fixture wherein a double stop arrangement is made possible, and in carrying out the concept a minimum amount of added parts are required to be furnished and incorporated in the fixture at the time of manufacture thereof.

A further special object of the invention is to provide novel form of secondary or second shut off unit which avails of the water pressure to compel the seating of the valve portion thereof, for shutting off the water, and relies upon the manipulation of the usual valve instrumentalities for effecting the opening and permitting flow of water through the fixture.

The invention involves the use of a combination of secondary valve members, involving a pivoted member and a substantially uniformly movable member, depending upon the pivoted member to apply a cam action to the first member mentioned, to provide an effective secondary shut off unit.

Other and further objects of the invention will be understood from a consideration of the specification appended hereto, and shown in the drawings, wherein:

Figure 1 is a vertical sectional view through a portion of a concealed type of fixture, illustrating the general arrangement and showing one form of the secondary shut off unit position.

Figure 1A is a perspective view of the seat member availed of in the primary control unit, which makes possible the shutting off of the water with the pressure in contrast to the opposing action usually required.

Figure 1B is a fragmentary view, in end elevation, showing in dotted line the water passage and water chamber provided in the fixture.

Figure 2 is a greatly enlarged vertical sectional view, showing a modification of a secondary control unit, involving the use of a pair of valve members and illustrating in dotted line certain positions thereof.

Figure 3 is a cross sectional view, taken about on the line 3—3 of Figure 2, looking in the direction of the arrows.

Referring now to Figures 1 and 1B, there is shown a valve body generally designated 1, comprising an upwardly open casting open at 2, the opening 2 being provided with the threads 3 therein. As shown in Figure 1B, the body is provided with a ground joint coupling section 4, suitably threaded to receive thereon a ground joint coupling nut. The coupling section 4 is that section through which the water flows and into the passage within the valve body 1, which passage is generally designated 5, the same continuing up and through a water chamber generally designated 6. The water chamber in turn communicates with the continuation of the passage 5 denoted 7, and thence to the source of use as will be apparent.

The water chamber 6 is formed integrally in the body and includes an inlet at 8, in which is seated the secondary control unit generally designated 50 and more particularly to be described hereinafter.

The outlet of the chamber 6 designated 10 is formed so as to support thereabove the valve seat extension member or valve seat member 11, being sealed with respect to the chamber 6 at the outlet 10 by means of a suitable gasket 12. The seat member 11 is maintained in position as shown by the bonnet 13, which bonnet is suitably sealed with respect to the opening 2 previously referred to by means of a gasket 14. The bonnet in turn is threaded so as to engage the threads 3 previously mentioned, the bonnet further being provided with a threaded stem 15 having the usual quick acting threads 16 thereon. The stem may be provided with a gland packing nut 17 and a sealing gasket 18 as will be readily understood, the packing nut 17 being screwed into suitable threads 19 formed within the upper end of the bonnet 13.

At the lower end of the stem 15, the same is provided with a cup-shaped member 20 thereon, adapted to receive a suitable seat washer 21, the same being maintained in place on the end of the stem by a nut 22 which nut 22 engages suitable threads 23 formed on an extension of the stem 15 and further extending on beyond the nut as at 24. It will be noted that the seat member 11 shown in somewhat greater detail in Figure 1A, is formed with suitable openings 25 therein to permit flow of water in the cycle as will be subsequently explained.

The foregoing unit involving the bonnet 13, stem 15, seat washer 21 and cup 20 together with the extension 24 and nut 22, comprise what may be termed the primary control unit, the same operating by revolving the stem 15 in the usual manner, by means of a handle (not shown) so as to move the washer 21 toward and from the lower end 11a of the seat unit 11. It will be understood that when water is within the chamber and flowing into the chamber 6, with the seat washer 21 in suitable contact with the portion 11a of the seat 11, further flow of the water will not take place. The foregoing parts generally described are usual in nature, except for the fact that the seat member 11 is of novel form, and permits the seating of the seat washer 21 on the seat section 11a with pressure, in contrast to the usual manner of operation of a valve wherein the seat washer is seated against water pressure.

Referring now to Figures 2 and 3, a form of secondary control unit is shown, and designated generally as 50. The unit 50 comprises a substantially circular body member 51, having a downwardly extending skirt 52 thereon which is suitably threaded at 53 so as to engage corresponding threads in the inlet 8, the body 51 being further provided with a flange 54 as will be clear.

In this device, a disc-like valve member 55 and pivoted valve member 56 are provided. The valve member 55 includes the legs or guide members 57 thereon adapted to properly guide the disc 55 as it moves upwardly and downwardly. The upper face of the member 56 is adapted to contact the lower face of the member 55 by reason of the form of the unit 56 which includes a cam section 58 thereon, at the end of which the member 56 is pivoted at 59, whereby when the stem and associated parts including the extension thereon, illustrated in dotted line in the figures, move into the position shown, same will cause the member 55, and member 56 to move into the corresponding dotted position, it being noted that the member 56 pivots around the point 59. A suitable stop extension 60 is provided on the member 56 to prevent the member 56 from moving too far downwardly into a position whereby water pressure would not properly actuate the same. It will also be noted that as the stem 15 with the extension 24 thereon, contacts the upper face of the disc 55, it will also cause the member 56 to be pivoted around the point 59 against the water pressure being exerted beneath the same. Thereafter, when the stem 15 is manipulated so as to raise the extension 24 upwardly, the water pressure exerted beneath the member 56 in its dotted line position will cause the same to rotate about the point 59 and by reason of the camming action of the portion 58, will correspondingly cause the disc 55 to be raised into its closed position as shown in full lines in Figure 2. Thus the water pressure is availed of and through a camming arrangement, causes the member 55 to be positively seated against the opening and prevent further flow of liquid or water therethrough.

There has thus been shown and described a novel form of valve structure which makes use of the water pressure to close a secondary control unit, making possible the removal of the normally provided or primary control unit, and its associated parts, for replacement or renewal of the same; and in addition the unit involving the secondary control unit does not interfere or in any way adversely affect the operation of the unit, so that normal manipulation is possible and yet the additional function of ease of replacement of parts is provided.

I claim:

In a valve of the class described, in combination, a valve body, a water passage in said body, a water chamber forming a portion of said passage and having an inlet and outlet portion, a first control valve unit having parts to close the outlet and a stem having an extension thereon, a second control unit mounted in the inlet comprising a valve disk and a seat member, said disk being mounted for pivotal movement toward and from said seat in the path of flow of water operable by said flow, and a second disk mounted for movement intermediate the pivoted disk and seat, the stem extension being adapted to engage said second disk to cause opening movement thereof, and the pivoted disk having a cam portion to engage and move the second disk into closing contact with the seat aforesaid.

References Cited in the file of this patent
UNITED STATES PATENTS

| | | |
|---|---|---|
| 1,080,369 | Rollwing | Dec. 2, 1913 |
| 1,093,514 | Wilson | Apr. 14, 1914 |
| 1,123,801 | Robinson | Jan. 5, 1915 |
| 2,336,282 | Mueller | Dec. 7, 1943 |